(No Model.)
E. H. McKAY.
FLUSHING APPARATUS FOR WATER CLOSETS.
No. 582,430. Patented May 11, 1897.
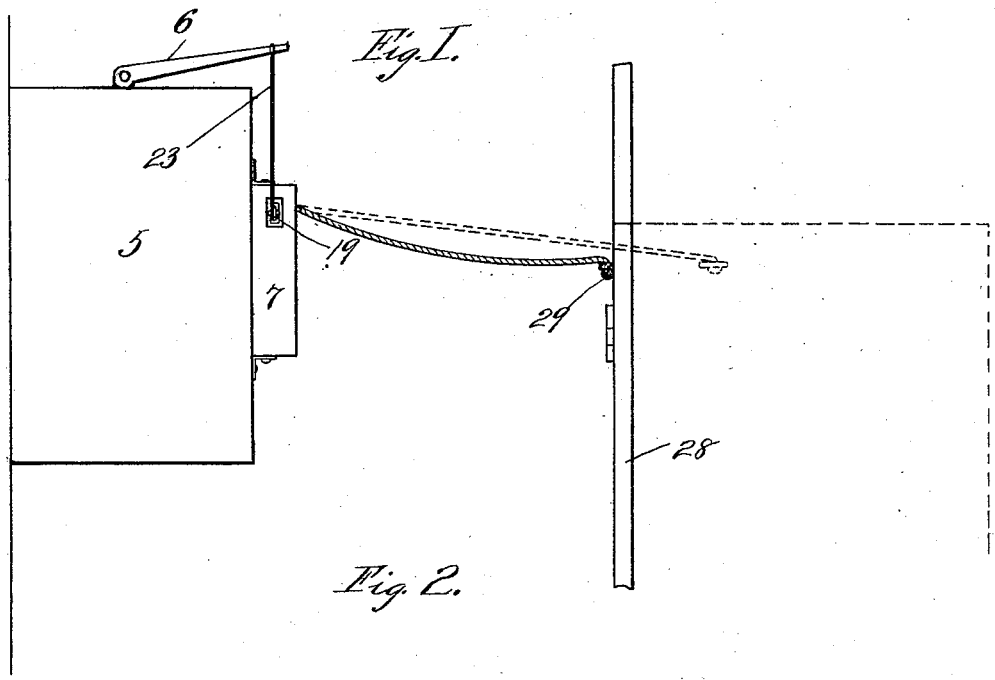
WITNESS:
INVENTOR
Eugene H. McKay
BY Edgar Tate & Co
ATTORNEYS

UNITED STATES PATENT OFFICE.

EUGENE HAYS McKAY, OF JACKSONVILLE, FLORIDA.

FLUSHING APPARATUS FOR WATER-CLOSETS.

SPECIFICATION forming part of Letters Patent No. 582,430, dated May 11, 1897.

Application filed September 10, 1896. Serial No. 605,423. (No model.)

*To all whom it may concern:*

Be it known that I, EUGENE HAYS McKAY, a citizen of the United States, and a resident of Jacksonville, in the county of Duval and State of Florida, have invented certain new and useful Improvements in Flushing Apparatus for Water-Closets, of which the following is a specification, reference being had to the accompanying drawings, forming a part thereof, in which similar numerals of reference indicate corresponding parts wherever found throughout both views.

This invention relates to flushing apparatus for water-closets; and the object thereof is to provide an improved apparatus of this class whereby the closet-basin will be flushed each time that the closet-door is opened.

The invention is fully disclosed in the following specification, of which the accompanying drawings form a part, in which—

Figure 1 is a side view of the flush-tank of a water-closet, showing also the door of the closet and my improved apparatus connected therewith; and Fig. 2, a side view of a casing which forms a part of the apparatus with one side thereof removed.

In the drawings forming part of this specification I have shown at 5 an ordinary water-closet flush-tank which, as will be understood, is in communication with the closet-basin, which is not shown, and said tank is also provided with a valve by which said communication is controlled, and said valve is operated by a lever 6, all of said parts being of the usual construction and not shown in details. I also provide a casing 7, which in practice is secured to the side of the flush-tank 5, and in the lower part of said casing is mounted a lever 8, which is pivoted at 9, and below the lever 8 is a contractile spring 10, one end of which is secured at 11 and the other to the lower side of said lever, near the free end thereof, as shown at 12, and beneath the free end of said lever is a pin 13, which limits the downward movement thereof, and secured vertically in said casing is a plate or bar 14, the lower end of which is provided with a set-screw 15, which is intended to limit the upward movement of said lever.

Pivotally connected with the lever 8 and centrally thereof is an arm 16, provided on one side with a rounded shoulder or projection 31, and to which is secured, near the pivotal point 17 thereof, a contractile spring 18, which is curved outwardly and upwardly and is connected with a lever 19, and said lever 19 is arranged transversely of the arm 16 of the lever 8, and the inner end of said lever 19 is adapted to rest upon an antifriction-roller 20, and the upper end of the arm 16 is adapted to be held in contact with said roller by the spring 18, and the inner end of the lever 19 is also held in contact with said roller by said spring, and said lever 19 projects through the side of the casing, as shown at 21, and the upper end of the arm 16 of the lever 8 is provided with an outwardly-directed shoulder 22, which serves to operate the lever 19, as hereinafter described.

Connected with the valve-lever 6 is a small rod or wire 23, which is also connected perpendicularly with the outer end of the lever 19, and connected with the free end of the lever 8 is a cord 24, which passes upwardly and over a suitable reversible pulley 25 and out through an opening 26 in the side of the casing and is secured to the door 28 of the closet, as shown at 29, preferably about six or eight inches from the upper hinge. If the door 28 is hinged so as to open inwardly, however, it would be necessary to connect said cord with a suitable pulley secured to the frame of the door and then to connect the end thereof with a bracket or arm secured to the door.

The operation will be readily understood from the foregoing description when taken in connection with the accompanying drawings and the following statement thereof. When the door 28 of the closet is opened, the cord 24 will be drawn outwardly, as shown in dotted lines in Fig. 1, and the free end of the lever 8 will be drawn upwardly. The arm 16 will also be forced upwardly, and the inner end of the lever 19 will be raised thereby and the outer end of said lever depressed, and this operation will operate the valve-lever 6, and the opening of the door and the raising of the arm 16, and the consequent pressure of the shoulder or projection 31, formed thereon, against the antifriction-roller 20, releases the transverse lever 19, allowing said lever to drop back to its original position of rest upon or against the antifriction-roller 20. This operation in itself results in flushing the basin, although the door 28 may not be entirely open when the lever 19 trips, and it will be understood that when the door 28 is held open there is no waste of water, the apparatus being automatically reset when the door is again opened. When the door 28 is again opened, the valve-lever 6 will be again operated as above described and the valve of the flush-tank will be opened, and this operation will be repeated each time that the door of the closet is opened.

The casing 7 may be secured to either side of the back 5 and may also under certain circumstances be connected with or secured to the side of the closet, and my invention is not limited to the location of said casing.

The body portion of the spring 18 is curved outwardly, as hereinbefore described and as shown in Fig. 2, and is held in such position by a wire or other fastening device at 30, but this construction is not absolutely essential, and two springs may be substituted for the spring 18, if desired, and other changes in and modifications of the construction herein described may be made without departing from the spirit of my invention or sacrificing its advantages.

Having fully described my invention, I claim as new and desire to secure by Letters Patent—

1. In an apparatus for operating the valve of the flush-tank of a water-closet, a casing provided with a lever which projects through the side thereof, and which is provided with a cord which is adapted to be secured to the valve of the flush-tank, another lever mounted in said casing and provided with a cord, rope or wire which is adapted to be connected with the door of the closet, said last-named lever being provided with a pivoted arm which extends upwardly, and which is adapted to support the inner end of the lever which is connected with the door, said arm and said lever being each provided with a spring, and a friction-roller or support which is mounted in said casing, and against which the end of said arm and the inner end of said lever are held by said spring, substantially as shown and described.

2. In an apparatus for operating the valve of the flush-tank of a water-closet, the combination with said tank, of a casing which is secured thereto, a spring-operated lever mounted therein, and connected with a lever by which the valve is operated, another lever mounted in said casing and connected with the door of the closet, by a cord or similar device, which passes over a pulley or roller mounted in the casing, said last-named lever being also provided with a pivoted arm which projects upwardly in said casing, and which is adapted to operate the inner end of the lever which is connected with the valve of the flush-tank, said casing being also provided with a friction-roller or support, in connection with which said arm and said last-named lever also operate, substantially as shown and described.

3. In an apparatus for operating the valve of the flush-tank of a water-closet, the combination with said tank, of a casing which is secured thereto, a spring-operated lever mounted therein, and connected with a lever by which the valve is operated, another lever mounted in said casing and connected with the door of the closet, by a cord or similar device, which passes over a pulley or roller mounted in the casing, said last-named lever being also provided with a pivoted arm which projects upwardly in said casing, and which is adapted to operate the inner end of the lever which is connected with the valve of the flush-tank, said casing being also provided with a friction-roller or support, in connection with which said arm and said last-named lever also operate, and said last-named lever and said arm being also held in connection with said roller or support by a spring, substantially as shown and described.

In testimony that I claim the foregoing as my invention I have signed my name, in presence of the subscribing witnesses, this 3d day of September, 1896.

EUGENE HAYS McKAY.

Witnesses.
 RAYMOND D. KNIGHT,
 GUY R. PRIDE.